United States Patent [19]

Rhodes

[11] Patent Number: 4,959,922
[45] Date of Patent: Oct. 2, 1990

[54] AQUATIC TRAP FUNNEL

[76] Inventor: Robert J. Rhodes, 5350 San Martine St., Stevensville, Mich. 49127

[21] Appl. No.: 334,866

[22] Filed: Mar. 3, 1989

[51] Int. Cl.$^5$ .............................................. A01K 69/06
[52] U.S. Cl. .................................................... 43/100
[58] Field of Search ................. 43/100, 101, 102, 103, 43/104, 105, 122

[56] References Cited

U.S. PATENT DOCUMENTS

| | | | |
|---|---|---|---|
| 3,497,989 | 6/1968 | Schultz | 43/100 |
| 3,772,818 | 11/1973 | Gardina | 43/100 |
| 3,906,654 | 9/1975 | Leslie | 43/100 |
| 3,916,558 | 11/1975 | Crouch | 43/100 |
| 4,075,779 | 2/1978 | Olafson | 43/100 |
| 4,554,759 | 11/1985 | Edling | 43/100 |

Primary Examiner—Richard K. Seidel
Assistant Examiner—James Miner
Attorney, Agent, or Firm—Robert C. Tucker; William David Kiesel

[57] ABSTRACT

An improved aquatic animal trap funnel made of a hollow, plastic conical tube, inside a crayfish trap, fitting over a pre-existing mesh funnel. The solid sheet funnel acts to retain more, larger crayfish by hindering escapes, encouraging a behavioral response for shelter, and retarding mesh funnel deformation.

4 Claims, 1 Drawing Sheet

AQUATIC TRAP FUNNEL

BACKGROUND OF THE INVENTION—FIELD OF THE INVENTION

This invention relates to capturing animals (crayfish), specifically to an improvement to existing aquatic animal traps.

BACKGROUND OF THE INVENTION—DESCRIPTION OF PRIOR ART

The crayfish industry has, in part, grown rapidly in the last fifteen years by stressing trap quantity over quality. To increase industry's catch, much work has been done to increase traps/acre, increase acreage, and to improve feeds and baits. However, an inherent problem has been that mesh funnel entrances have allowed captured animals to escape. No attempt has been made to address this amount of harvest loss. In practice, mesh funnels tend to become deformed through use, decreasing trap efficiency. Funnel escapes and funnel deformation have shown the need to improve current crayfish traps. Also, a review of patented prior art shows that solid material funnels occur with minnow traps and mesh funnels occur with the rest of the aquatic traps. There is no combination of the two funnel types.

OBJECTIVES AND ADVANTAGES OF THE INVENTION

The addition of a solid sheet, hollow conical funnel with open ends inserted over a pre-existing mesh funnel has reduced the problems of crayfish escapes and funnel deformation. Accordingly, several objectives and advantages of my invention over uncovered mesh funnels are:

(1) impeding crayfish escapes while not hindering their entry,
(2) retention of more, larger crayfish,
(3) providing directional crayfish shelter into the trap, facilitating capture,
(4) causes catch peak to occur about 24 hours after baiting whereas the current funnel causes the peak to occur about 7 hours after baiting and lends itself to poaching at night, and
(5) helps to maintain mesh funnel's shape by following the mesh funnel's contour and not extending much past it.

Further objects and advantages of my invention will become apparant from a consideration of the drawing and ensuing description of it.

DESCRIPTION OF PREFERRED EMBODIMENTS OF THE INVENTION

Figure 1:
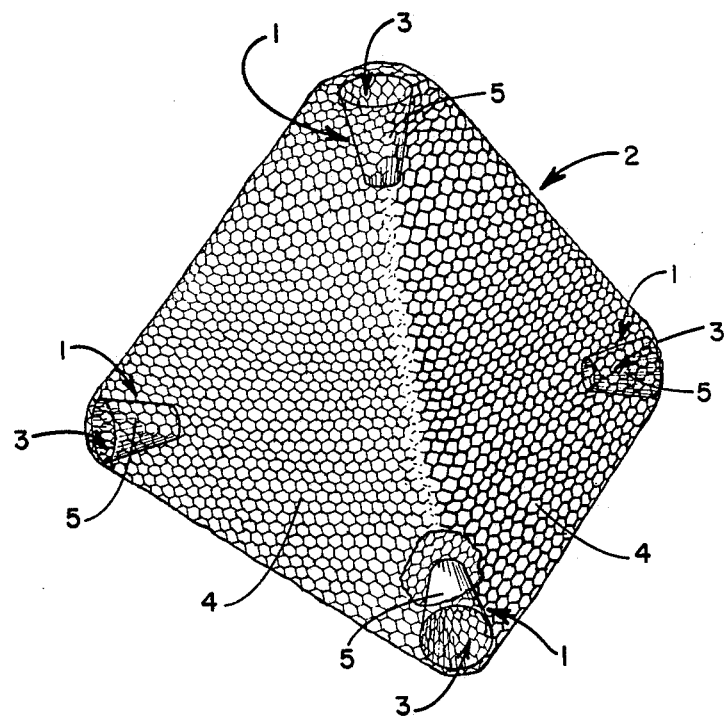
FIG. 1 is a perspective view of an aquatic animal trap with embodiments of the invention installed thereon.
Figure 2:
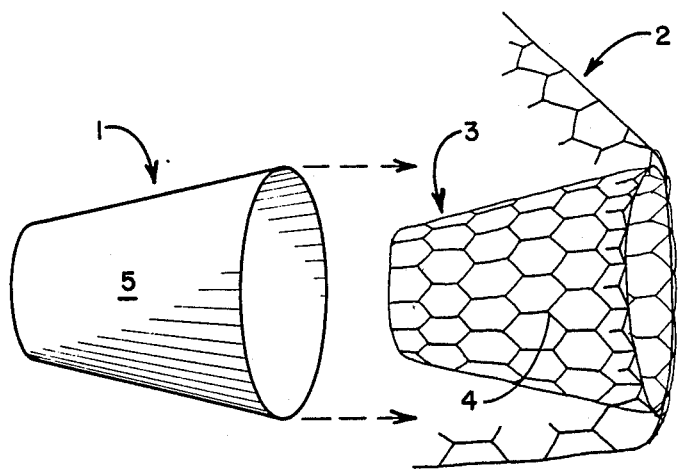
FIG. 2 is an exploded perspective view of an embodiment of the invention and a mesh funnel entrance to an aquatic animal trap.

FIGS. 1 and 2 show the overall view of the aquatic animal funnel in place in an aquatic animal trap 2. As it was invented to act as an animal retention collar, it easily and simply slips over a pre-existing mesh funnel(s) 3 on the inside of trap 2 (as shown in FIG. 2) and is securely anchored onto the mesh 4. The funnel 1, when attached to mesh funnel 3, may take various forms of smooth laminating material such as plastic, metal or glass.

OPERATION

The function of the solid plastic sheet funnel 1 in combination with the mesh funnel 3 is to retain more aquatic animals than the mesh funnel 3 or a solid sheet funnel 3 alone. After a crayfish climbs through the mesh funnel and into the trap 2, it encounters a physical barrier (the invention 1) of a low friction, non-grippable surface 5 inside the trap that impedes its escape. More larger animals are retained as they tend to be the first to enter. In the relatively shelterless water environment, the solid plastic sheet funnel 1 provides more covering habitat, behaviorally attracting crayfish into the trap 2. Also, the relatively stiff plastic funnels 1 greatly improve the strength and durability of the mesh funnels 3.

Thus, the reader will see that the funnel of the invention provides a simple, yet more effective device in enhancing the harvesting of crayfish. While this description contains many specificities, these should not be construed as limiting the invention's scope, but rather as an exemplification of one preferred, embodiment of the idea. Many other variations are possible. Other aquatic animals (lobsters, crabs, shrimp, snails, fish, ect.) and terrestrial species may also be more efficiently captured with this invention. Other designs are possible for example: funnels with mesh different than the trap mesh, different colors or clear, different materials, different dimensions, different angles of orientation to the water bottom, funnels with automatic angle adjusters for temperature changes, funnels attached to the trap without covering mesh funnels, partial funnels, stiffening elements, and part of a pre-assembled trap bottom.

We claim:

1. In combination with an aquatic animal trap having at least one entrance opening formed by an inwardly protruding mesh entrance tube, an improvement comprising a substantially smooth layer of laminating material attached to and substantially covering said mesh entrance tube on the inside of said trap.

2. In combination with an aquatic animal trap having at least one entrance opening formed by an inwardly protruding mesh entrance tube, an improvement comprising an interior tube, having a substantially smooth outer shell, said tube being matingly attached over and substantially covering said mesh entrance tube on the inside of said trap.

3. The combination according to claim 1, wherein said entrance tube and said layer of laminating material are funnel-shaped.

4. The combination according to claim 2, wherein said entrance tube and said interior tube are funnel-shaped.

* * * * *